No. 866,202. PATENTED SEPT. 17, 1907.
E. M. HOSTETTER.
TRANSMISSION GEARING.
APPLICATION FILED MAY 24, 1907.
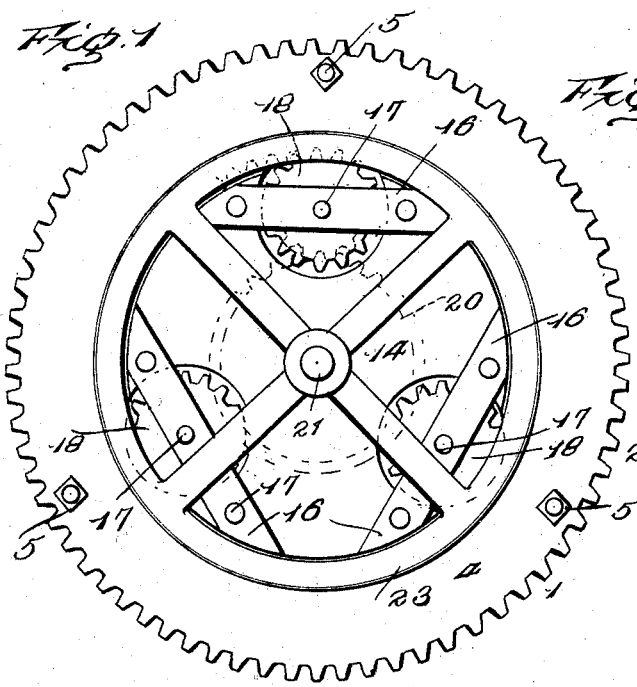
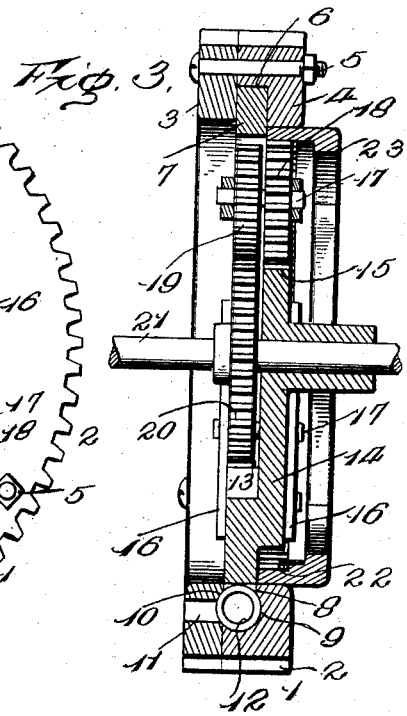
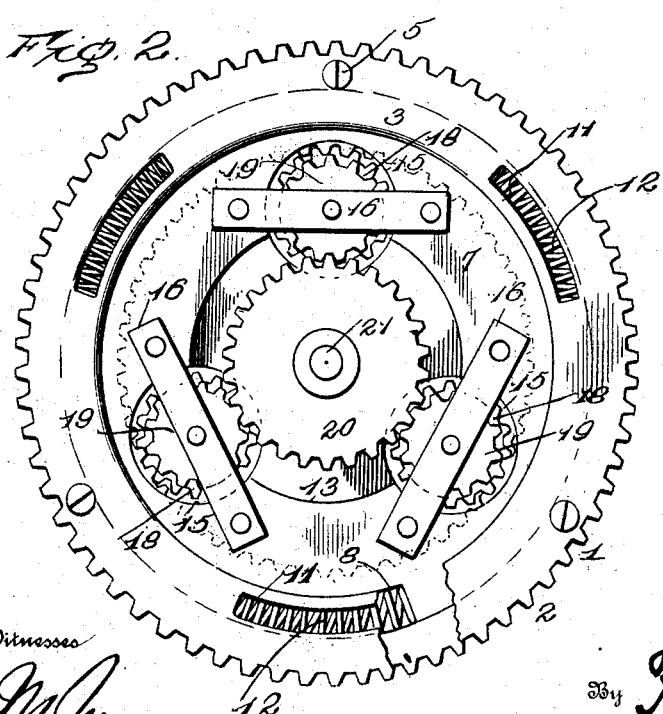
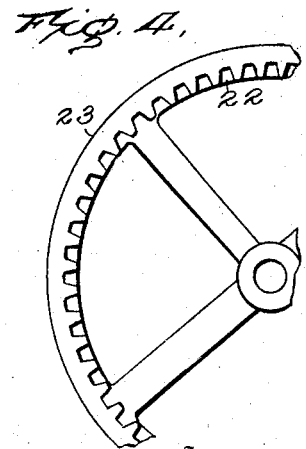
Inventor
E. M. Hostetter

UNITED STATES PATENT OFFICE.

ENOS M. HOSTETTER, OF NEW PROVIDENCE, PENNSYLVANIA.

TRANSMISSION-GEARING.

No. 866,202.     Specification of Letters Patent.     Patented Sept. 17, 1907.

Application filed May 24, 1907. Serial No. 375,460.

*To all whom it may concern:*

Be it known that I, ENOS M. HOSTETTER, a citizen of the United States, residing at New Providence, in the county of Lancaster and State of Pennsylvania, have invented certain new and useful Improvements in Transmission-Gearings, of which the following is a specification.

The present invention relates to certain new and useful improvements in the construction of transmission gearing, and more particularly to that type which is commonly termed compensating gearing and is so designed as to enable the outer wheels of a vehicle to move faster than the inner wheels when the vehicle is making a turn.

The object of the invention is to provide a simple and inexpensive gearing which is reliable in its operation and comprises few and durable parts which can be quickly assembled or dismounted as may be required.

For a full description of the invention and the merits thereof and also to acquire a knowledge of the details of construction and the means for effecting the result, reference is to be had to the following description and accompanying drawings, in which:

Figure 1 is a front view of the improved compensating gearing. Fig. 2 is a back view of the same portions being broken away. Fig. 3 is a transverse sectional view. Fig. 4 is a fragmental view of one of the wheels.

Corresponding and like parts are referred to in the following description and indicated in all the views of the drawings by the same reference characters.

Referring to the drawings the numeral 1 designates the outer rim of the gearing which is provided upon its periphery with the usual teeth 2. In the specific construction of the outer rim 1 it will be observed that the same comprises two sections 3 and 4 which are designed to be rigidly connected by fastening members such as the bolts 5. The inner edge of the section 4 is rabbeted as indicated at 6 to receive the edge portion of a plate 7 which carries the gear mechanism. A plurality of notches 8 are formed in the periphery of the plate 7 and the rabbeted portion 6 is formed with longitudinal depressions 9 corresponding to the notches 8. The section 3 of the rim 1 is also provided with depressions 10 corresponding to the notches 8 and a portion of these depressions are in communication with slots 11. Spiral springs 12 are received within the notches 8 and the corresponding depressions 9 and 10, the extremities of the springs engaging the shoulders at the ends of the depressions whereby the plate 7 and the outer rim 1 have a limited degree of motion with respect to each other, the springs 12 constituting cushioning members to absorb all shocks and jars due to the sudden application of power.

The plate 7 has the middle portion thereof pressed outwardly whereby a recess 13 is formed on one side thereof while the opposite side is formed with a circular enlargement 14. A plurality of openings 15, preferably three, extend through the plate 7 and straps 16 applied to opposite sides of the said plate pass transversely across the openings and form bearings for the shafts 17. Each of these shafts 17 carries a pair of pinions 18 and 19 which are designed to rotate with each other. In the present instance the pinions 19 are shown as being of a smaller formation than the pinions 18 and mesh with a gear wheel 20 mounted within the recess and keyed to a shaft 21 passing centrally through the plate 7. The opposite pinions 19 mesh with corresponding teeth upon the inner face of a lateral flange 22 extending from the periphery of a wheel 23 and receiving the enlarged portion 14 of the plate. This wheel 23 is received loosely within the section 3 of the outer rim 1 and rotates freely upon the shaft 21. It will thus be apparent that the pinions 18 and 19 can be so proportioned as to cause the gear wheel 20 and the wheel 23 upon opposite sides of the plate 7 to rotate at any desired relative speeds. It will further be apparent that owing to the springs 12 interposed between the outer rim and the plate 7 the two members have a yielding connection and will absorb any shocks or jars due to the sudden application of power to either of the members. Attention may also be directed to the fact that owing to the provision of the slots 11 the springs 12 may be readily inspected in order to determine whether or not they are working properly without the necessity of dismounting the gearing.

Having thus described the invention, what is claimed as new is:

1. The combination of a plate having an opening formed therein, a shaft carried by the plate and extending through the opening, a pair of pinions mounted upon the shaft and rigid with each other, a gear wheel mounted upon one side of the plate and meshing with one of the pinions, and a second wheel mounted upon the opposite side of the plate and carrying a toothed flange meshing with the opposite pinion.

2. The combination of an outer rim, a plate loosely mounted upon the outer rim and having an opening formed therein, yielding means interposed between the plate and outer rim, a shaft carried by the plate and extending through the opening therein, a pair of pinions mounted upon the shaft and rigid with each other, a gear wheel mounted upon one side of the plate and meshing with one of the pinions, and a wheel mounted upon the opposite side of the plate and meshing with the opposite pinion.

3. The combination of a plate having an opening formed therein, straps extending across the opening upon opposite sides of the plate, a shaft journaled on the straps, pinions mounted upon the shaft, a gear wheel mounted upon one side of the plate and meshing with one of the pinions, and a wheel mounted upon the opposite side of the plate and meshing with the opposite pinion.

4. The combination of a plate having an opening formed therein, straps extending across the opening upon opposite sides of the plate, a shaft journaled between the said straps, a pair of pinions mounted upon the shaft and rotating with each other, a gear wheel mounted upon one side of the plate and meshing with one of the pinions, and a wheel mounted upon the opposite side of the plate and carrying an annular flange provided with teeth meshing with the opposite pinion.

5. The combination of a plate having an opening therethrough and having a recess upon one side thereof and an enlargement upon the opposite side, straps extending transversely across the opening upon opposite sides of the plate, a pair of pinions mounted upon the shaft and rigid with each other, a gear wheel loosely mounted within the recess upon one side of the plate and meshing with one of the pinions, and a wheel mounted upon the opposite side of the plate and provided with an annular flange receiving the enlargement upon the plate and formed with teeth meshing with the opposite pinion.

6. The combination of an outer rim, a plate loosely mounted upon the outer rim and provided upon one side with a recess and upon the opposite side with an enlargement, the said plate being formed with an opening, yielding means between the plate and the outer rim, straps extending transversely across the opening upon opposite sides of the plate, a shaft journaled between the straps, a pair of gear wheels mounted upon the shaft and rigid with each other, a gear wheel mounted within the recess upon one side of the plate and meshing with one of the pinions, and a wheel provided with an annular flange receiving the enlargement upon the opposite side of the plate and formed with teeth meshing with the opposite pinion.

In testimony whereof I affix my signature in presence of two witnesses.

ENOS M. HOSTETTER.

Witnesses:
LARY RINEER,
HIRAM R. HEAGY.